United States Patent Office 3,734,904
Patented May 22, 1973

---

3,734,904
6-(1-AMINOTHIOCYCLOALKANOYL AMINO) PENICILLANIC ACIDS
Gerhard R. Wendt, Havertown, Donald E. Clark, Norristown, and Norman H. Grant, Wynnewood, Pa., assignors to American Home Products Corporation, New York, N.Y.
No Drawing. Filed July 23, 1971, Ser. No. 165,712
Int. Cl. C07d 99/16
U.S. Cl. 260—239.1                5 Claims

ABSTRACT OF THE DISCLOSURE 6-(1-aminothiocycloalkanoyl amino) penicillanic acids are prepared from the appropriate amino acid N-carboxyanhydrides. The products exhibit anti-bacterial activity.

BACKGROUND OF THE INVENTION

This invention relates to compositions of matter classified in the art of chemistry as 6 - (1 - aminothiocycloalkanoyl amino) penicillanic acids.

SUMMARY OF THE INVENTION

The invention sought to be patented as a composition of matter is described as residing in the concept of a chemical compound of the formula:

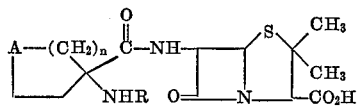

wherein A is —S—,

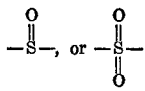

R is hydrogen and lower alkyl; and $n$ is 1 or 2.

Preferred compounds are those wherein R is hydrogen. The tangible embodiments of the compositions of the invention possess the inherent general physical properties of being solids which decompose at high temperatures; are soluble in basic aqueous solutions; and are substantially the compositions sought to be patented.

Examination of compounds, produced according to the hereinafter described process, reveals upon infra-red spectrographic analysis spectral data confirming the molecular structure hereinbefore set forth. The aforementioned physical characteristic taken together with the nature of the starting materials, the mode of synthesis, and the elemental analysis positively confirm the structure of the compositions sought to be patented.

The tangible embodiments of the invention possess the inherent applied use characteristics of exerting an anti-bacterial effect, as evidenced by standard biological tests. The anti-bacterial effects are demonstrated in vitro by the agar plate dilution method which is generally described on pp. 303–305 in the "Manual of Clinical Microbiology," J. E. Blair et al. editor, published by the American Society for Microbiology, 1970. The in vivo anti-bacterial effects are demonstrated by showing therapeutic activity in infected mice, the details of which are described in Example V.

The manner and process for making the invention will now be generally described so as to enable a person skilled in the art of chemistry to make the same as follows:

The manner of making the starting materials for use in making the compounds of the invention are illustrated in the copending and cofiled application of Gerhard R. Wendt, and Donald Oliver entitled, "1-Aminothiocycloalkanoic Acids," now U.S. Pat. 3,707,479. Referring now to the accompanying diagram, wherein the compounds are assigned Roman numerals for identification schematically, the sequence of reactions involved in the synthesis are illustrated for a specific embodiment, namely 6-(4-aminotetrahydro - 2H - thiopyran-4-carboxamido)penicillanic acid.

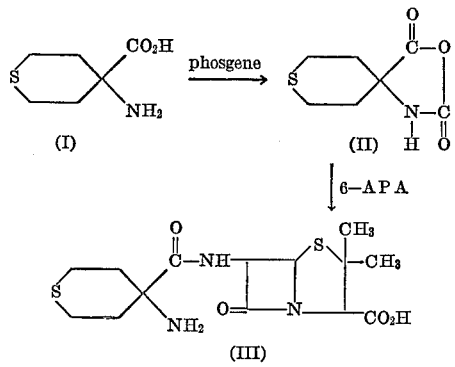

The 1-aminothiocycloalkanoic acid (I) is first converted to its corresponding N-carboxyanhydride (II) by treatment with phosgene in dry dioxane under anhydrous conditions at about 80° C. The N-carboxyanhydride (II) is isolated by conventional procedures and reacted with 6-aminopenicillanic acid at 0° C. in water to which sufficient triethylamine is added to give the pH of the mixture from about 6.0 to about 6.5. The 6-(1-aminothiocycloalkanoyl amino) penicillanic acid (III) is isolated and purified by conventional procedures, after acidification of the acid mixture.

As used herein, "lower alkyl" means an aliphatic hydrocarbon radical containing from one to about four carbon atoms, such as methyl, ethyl, propyl, isopropyl, and butyl.

The best mode contemplated by the inventors of carrying out their invention will now be set forth as follows:

DESCRIPTION OF THE PREFERRED EMBODIMENT

Example I.—6-(4-aminotetrahydro-2H-thiopyran-4-carboxamido) penicillanic acid (A) 4-aminotetrahydro-2H-thiopyran-4-carboxylic acid (2.0 g.) is suspended in 100 ml. of dry dioxane. The suspension is stirred for two hours at 80° C. under anhydrous conditions with an excess amount of phosgene. The reaction mixture is then allowed to cool to 25° C., and excess phosgene is purged by passing dry nitrogen through the system for 16 hours. Solid material is removed by filtration. The filtrate is taken to dryness by rotary evaporation. The residue is washed with petroleum ether and dried to give 4-aminotetrahydro-2Hthiopyran-4-carboxylic acid N-carboxyanhydride, (3-oxa-8-thia-1-azaspiro[4,5] decane-2,4-dione). Yield, 2.1 g.

(B) A suspension of 6-amino-penicillanic acid (2.6 g.) and 60 ml. of water is cooled in an ice bath. The pH of the suspension is adjusted to 5.9 with triethylamine. The amino acid N-carboxyanhydride (2.0 g.) prepared in (A) above is then added, and the resulting mixture is stirred at 0° C. for one hour. The mixture is then allowed to warm to 25° C. Upon standing, a precipitate forms. Filtration gives 1.0 g. of product. The pH of the filtrate is adjusted to 5.0 with acetic acid and material (1.3 g.) precipitates. The filtrate is lyophilized and the residue resuspended in 10 ml. of cold water. Filtration gives 0.7 g. of additional product. The three precipitates are pooled and dissolved in 50 ml. of water by adjusting the pH to 8.0 with triethylamine. The solution is filtered, and the pH of the filtrate is readjusted to 5.5 with acetic acid. Cooling of the filtrate yields the title compound. Yield 1.9 g.

Analysis for $C_{14}H_{21}N_3O_4S_2$.—Calculated (percent): C, 46.8; H, 5.9; N, 11.7; S, 17.1. Found (percent): C, 46.4; H, 6.1; N, 11.5; S, 17.5.

Example II.—6-(3-aminotetrahydro-3-thiophene-carboxamido)penicillanic acid 3-aminotetrahydro-3-thiophenecarboxylic acid (2.1 g.) is converted to the corresponding amino acid N-carboxyanhydride (3-oxa-thia-1-azaspiro[4,4]nonene-2,4-dione) by following the procedure of Part A of Example I. A suspension of 6-amino-penicillanic acid (2.3 g.) and 60 ml. of water is chilled in an ice bath. The pH of the suspension is adjusted to 6.0 with triethylamine. To the suspension is then added the amino acid N-carboxyanhydride, and the resulting mixture stirred at 3° C. for one hour. The mixture is then allowed to warm to 25° C. One and one-half hour later, the pH of the mixture is adjusted to pH 5.0 with acetic acid. Upon cooling, a precipitate forms. Filtration yields 2.3 g. of precipitation. The filtrate is lyophilized, and the residue is redissolved in 10 ml. of water. A precipitate forms and is collected by filtration. Weight, 0.7 g. The two precipitates are combined and recrystallized from water to give 2.0 g. of the title product.

Analysis for $C_{13}H_{19}N_3O_4S_2 \cdot H_2O$.—Calculated (percent): C, 43.0; H, 5.8; N, 11.6; $H_2O$, 5.0. Found (percent): C, 42.5; H, 5.7; N, 11.5; $H_2O$, 6.0.

Example III.—6-(4-aminotetrahydro-2H-thiopyran-4-carboxamido) penicillanic acid, 6-(S-oxide)

4-aminotetrahydro-2H-thiopyran - 4 - carboxylic acid, 1-oxide, is converted to the corresponding amino acid N-carboxyanhydride (3-oxa-8-thia-1-azaspiro [4,5]decane-2,4-dione-8-oxide) by following the procedure of Part A of Example I.

A suspension of 6-amino-penicillanic acid (2.5 g.) and 90 ml. of water is prepared. The pH of the suspension is adjusted to 6.5. To the suspension is then added the amino acid N-carboxyanhydride dissolved in 8 ml. of dioxane, and the resulting mixture is stirred for two hours at room temperature. The mixture is then filtered and the filtrate is lyophilized to give a crude product. The product is dissolved in 40 ml. of water at pH 5.1. The resulting solution is passed through a Dowex column (1 x 8 cm.) in the acetate form. Lyophilization of the effluent yields a residue which is resuspended in water. Filtration yields 750 mg. of product. Recrystallization from water gives 400 mg. of the title compound.

Analysis for $C_{14}H_{21}N_3O_5S_2$.—Calculated (percent): C, 44.8; H, 5.6; N, 11.2; S, 17.1. Found (percent): C, 44.3; H, 5.6; N, 11.2; S, 17.3.

Example IV.—6-(4-aminotetrahydro-2H-thiopyran-4-carboxamido) penicillanic acid 6-(S,S-dioxide)

4 - aminotetrahydro-2H-thiopyran-4-carboxylic acid, 1,1-dioxide (2.0 g.) is converted to the corresponding amino acid N-carboxyanhydride, (3-oxa-8-thia-1-azaspiro [4,5]decane-2,4-dione-8,8-dioxide following the procedure of Part A of Example I.

A suspension of 6-amino-penicillanic acid and 25 ml. of water is cooled in an ice bath. The pH of the suspension is adjusted to pH 6.0 with triethylamine. To the suspension is then added the amino acid N-carboxyanhydride, and the resulting mixture is stirred for two hours at 4° C. The mixture is then allowed to cool at 25° C. and stirred for an additional hour. The pH of the reaction mixture is adjusted to 5.0. The resulting precipitate is filtered and recrystallized from water to yield 720 mg. of the title product.

Analysis for $C_{14}H_{21}N_3O_6S_2$.—Calculated (percent): C, 42.9; H, 5.4; N, 10.7. Found (percent): C, 42.3; H, 5.5; N, 10.6.

Example V

The compounds of this invention are tested in vitro by the agar plate dilution method as follows:

A stock solution of the test compound at 10,000 μg./ml. is prepared. Two-fold dilutions are made with sterile water, and 1 ml. quantities of each dilution are incorporated in 9 ml. of seed agar in sterile petri dishes. Hardened surfaces are inoculated with test organisms and incubated 18 hours at 35° C. The activity of the test compound is measured as the minimal inhibitory concentration expressed in μg./ml., defined as the least amount of material that completely inhibits the test organism.

The results of the testing of representative compounds against a spectrum of organisms is given in the following table where compounds A, B, C, and D are, as follows:

A____ 6-(4-aminotetrahydro-2H-thiopyran-4-carboxamido) penicillanic acid.

B____ 6-(3-aminotetrahydro-3-thiophenecarboxamido) penicillanic acid.

C____ 6-(4-aminotetrahydro-2H-thiopyran-4-carboxamido) penicillanic acid, 6-(S-oxide).

D____ 6-(4-aminotetrahydro-2H-thiopyran-4-carboxamido) penicillanic acid 6-(S,S-dioxide).

| Compound | Minimum inhibitory concentration, μg./ml. | | | |
|---|---|---|---|---|
| | A | B | C | D |
| Test organism: | | | | |
| Bacillus substillus 6633 | .976 | .488 | .488 | .488 |
| Staphylococcus aureus 6538P | .976 | .488 | .976 | .976 |
| Staphylococcus aureus Smith | .976 | .976 | .976 | .976 |
| Staphylococcus aureus CHP | 7.81 | 7.81 | 15.6 | 31.3 |
| Staphylococcus aureus 53–180 | >250 | 31.3 | 250 | 250 |
| Mycobacterium smegmatis 10143 | >250 | >250 | >250 | >250 |
| Neisseria catarrhalis 8193 | 7.81 | 15.6 | 15.6 | 62.5 |
| Pseudomonas aeruginosa 10145 | >250 | >250 | >250 | >250 |
| Escherichia coli 9637 | 62.5 | 125 | 62.5 | 125 |
| Escherichia intermedia 65–1 | 125 | >250 | 250 | >250 |
| Salmonella paratyphi 11737 | 7.81 | 7.81 | 7.81 | 15.6 |
| Enterobacter aerogenes 13048 | >250 | >250 | >250 | >250 |
| Klebsiella pneumoniae 10031 | >250 | >250 | >250 | >250 |
| Bordetella bronchiseptica 4617 | >250 | >250 | >250 | >250 |
| Proteus vulgaris 6896 | 125 | 125 | 125 | 62.5 |
| Herellea sp. 9955 | 62.5 | 31.3 | 62.5 | 250 |

The in vivo antibacterial activity of the compounds of the invention is evaluated as follows:

Mice are divided into four groups of 10 mice in each group. The mice are injected intraperitoneally with 0.5 ml. of a standardized suspension of the infective agent in 5% gastric mucin. Six hours post injection each group of mice receives a single, graded dose of the test compound by the subcutaneous or oral route. All animals are observed for 14 days and deaths recorded daily. The $CD_{50}$ (curative dose) and $PD_{50}$ (protective dose) values are determined by the method of Reed and Muench, American J. of Hygiene, 27, 493 (1938).

The results of the testing of representative compounds are given below:

| Compound | Organism | Activity (mg.) | |
|---|---|---|---|
| | | $PD_{50}$ (S.C.) | $CD_{50}$ (P.O.) |
| 6-(4-aminotetrahydro-2H-thiopyran-4-carboxamido) penicillanic acid. | Staphlococcus aureus CHP | | 2.22 |
| | Pseudomonas aeruginosa | 28.8 | |
| 6-(3-aminotetrahydro-3-thiophenecarboxamido) penicillanic acid. | Staphylococcus aureus CHP | | 3.81 |
| | Pseudomonas aeruginosa | 28.8 | |
| | Salmonella typhimurium | | 1.37 |
| | Staphylococcus aureus CHP | | 2.43 |
| | Staphylococcus aureus Smith | | .146 |
| | Staphylococcus pyogenes C203 | | .395 |
| | Proteus mirabilis 3 | | 1.24 |
| | Proteus vulgaris 347 | | 1.8 |
| | Escherichia coli 920 | | 3.81 |

What is claimed:
1. A compound of the structural formula:

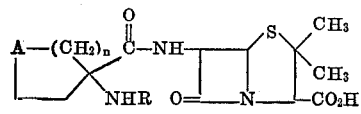

wherein A is

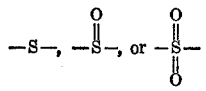

R is hydrogen or lower alkyl, and $n$ is 1 or 2.

2. A compound as defined in claim 1 which is 6-(4-aminotetrahydro-2H-thiopyran-4-carboxamido) penicillanic acid.

3. A compound as defined in claim 1 which is 6-(3-aminotetrahydro-3-thiophenecarboxamido) penicillanic acid.

4. A compound as defined in claim 1 which is 6-(4-aminotetrahydro-2H-thiopyran-4-carboxamido) penicillanic acid, 6-(S-oxide).

5. A compound as defined in claim 1 which is 6-(4-aminotetrahydro-2H-thiopyran-4-carboxamido) penicillanic acid 6-(S,S-dioxide).

References Cited
UNITED STATES PATENTS 3,558,602   1/1971   Alburn et al. _____ 260—239.1

NICHOLAS S. RIZZO, Primary Examiner

U.S. Cl. X.R.

424—271

UNITED STATES PATENT AND TRADEMARK OFFICE
Certificate
Patent No. 3,734,904                      Patented May 22, 1973

Gerhard R. Wendt, Donald E. Clark and Norman H. Grant

Application having been made by Gerhard R. Wendt, Donald E. Clark and Norman H. Grant, the inventors named in the above identified patent, and American Home Products Corporation, New York, N.Y., the assignee, for the issuance of a certificate under the provisions of Title 35, Section 256, of the United States Code, deleting the names of Donald E. Clark and Norman H. Grant, as joint inventors, and a showing and proof of facts satisfying the requirements of the said section having been submitted, it is this 10th day of January 1978, certified that the names of the said Donald E. Clark and Norman H. Grant are hereby deleted from the said patent as joint inventors with the said Gerhard R. Wendt.

FRED W. SHERLING,
*Associate Solicitor.*